(12) United States Patent
Park

(10) Patent No.: US 12,049,149 B2
(45) Date of Patent: Jul. 30, 2024

(54) GUIDE SYSTEM AND GUIDE METHOD FOR CHARGING HYDROGEN

(71) Applicants: HYUNDAI MOTOR COMPANY, Seoul (KR); KIA CORPORATION, Seoul (KR)

(72) Inventor: Min Gu Park, Pocheon-si (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 483 days.

(21) Appl. No.: 17/524,236

(22) Filed: Nov. 11, 2021

(65) Prior Publication Data

US 2022/0367891 A1 Nov. 17, 2022

(30) Foreign Application Priority Data

Apr. 29, 2021 (KR) .......................... 10-2021-0055412

(51) Int. Cl.
*H01M 8/04082* (2016.01)
*B60L 53/30* (2019.01)
*B60L 58/30* (2019.01)
*B67D 7/04* (2010.01)
*F17C 5/00* (2006.01)

(52) U.S. Cl.
CPC .............. *B60L 53/30* (2019.02); *B60L 53/305* (2019.02); *B60L 58/30* (2019.02); *B67D 7/0401* (2013.01); *F17C 5/007* (2013.01); *H01M 8/04201* (2013.01); *B67D 2007/0446* (2013.01); *F17C 2250/034* (2013.01); *F17C 2250/0408* (2013.01); *F17C 2250/043* (2013.01); *H01M 2250/20* (2013.01); *Y02T 10/7072* (2013.01); *Y02T 90/12* (2013.01)

(58) Field of Classification Search
CPC ........ B60L 53/30; B60L 53/305; B60L 58/30; B67D 2007/0446; B67D 7/0401; F17C 2250/034; F17C 2250/0408; F17C 2250/043; F17C 5/007; H01M 2250/20; H01M 8/04201; Y02T 10/70; Y02T 10/7072; Y02T 90/12; Y02T 90/16
See application file for complete search history.

(56) References Cited

U.S. PATENT DOCUMENTS

2003/0083848 A1* 5/2003 Kami ...................... F17C 5/007
702/187

FOREIGN PATENT DOCUMENTS

JP 2004-028211 A 1/2004
JP 2019-074111 A 5/2019

* cited by examiner

*Primary Examiner* — Victoria H Lynch
(74) *Attorney, Agent, or Firm* — Morgan, Lewis & Bockius LLP

(57) ABSTRACT

The present disclosure provides a system and a method for guiding hydrogen charging, which may estimate a remaining hydrogen chargeable amount (remaining hydrogen storage amount), a charging time, and the like of a hydrogen charging station, and provide the estimated information to another vehicle to be charged through an Internet network when a driver charges hydrogen in a hydrogen tank of his/her fuel cell vehicle at the hydrogen charging station, such that the driver of the vehicle to be charged may recognize a maximum chargeable amount and a required charging time for a hydrogen tank of a vehicle to be charged for each hydrogen charging station, thereby allowing the fuel cell vehicles to visit the hydrogen charging station and smoothly charge hydrogen.

15 Claims, 4 Drawing Sheets

GUIDE SYSTEM AND GUIDE METHOD FOR CHARGING HYDROGEN

CROSS-REFERENCE TO RELATED APPLICATION

This application claims under 35 U.S.C. § 119(a) the benefit of priority to Korean Patent Application No. 10-2021-0055412 filed on Apr. 29, 2021, the entire contents of which are incorporated herein by reference.

BACKGROUND

(a) Technical Field

The present disclosure relates to a guide system and a guide method for charging hydrogen, and more specifically, to a guide system and a guide method for charging hydrogen for a fuel cell vehicle, which may provide a charging capacity information of a hydrogen charging station to a fuel cell vehicle requiring hydrogen charging in advance such that the hydrogen charging of the fuel cell vehicles may be smoothly performed.

(b) Background Art

Generally, a fuel cell vehicle is mounted with a fuel cell stack for traveling and a traction motor driven by using electric energy generated in the fuel cell stack.

Air should be supplied to a cathode of the stack while hydrogen is supplied to an anode of the fuel cell stack in order to generate the electric energy by the electrochemical reaction of the fuel cell stack.

To this end, the fuel cell vehicle is mounted with a hydrogen tank for supplying hydrogen to the anode of the fuel cell stack and an air blower for supplying air to the cathode.

Meanwhile, if there is the need for the hydrogen charging for the hydrogen tank of the fuel cell vehicle, the closest hydrogen charging station or the like may be used.

However, upon visiting the closest hydrogen charging station for charging hydrogen, if the remaining amount of hydrogen storage in the corresponding hydrogen charging station is exhausted or insufficient, it is impossible to charge hydrogen, thereby being stuck in a difficult situation, and as a result, it is necessary to move to another remote hydrogen charging station, thereby increasing discomfort upon hydrogen charging.

Further, when a driver moves to another remote hydrogen charging station capable of hydrogen charging, other vehicles other than his/her own vehicle are crowded, thereby causing the bottleneck of the vehicle around the hydrogen charging station, and furthermore, when the remaining amount of hydrogen in the hydrogen tank of his/her own vehicle during movement falls below a standard value, the traveling may become impossible.

The information disclosed in the Background section above is to aid in the understanding of the background of the present disclosure, and should not be taken as acknowledgement that this information forms any part of prior art.

SUMMARY OF THE DISCLOSURE

The present disclosure is devised to solve all of the above conventional problems, and an object of the present disclosure is to provide a system and a method for guiding hydrogen charging, which may estimate a remaining hydrogen chargeable amount (remaining hydrogen storage amount), a charging time, and the like of a specific hydrogen charging station and provide the estimated information to another fuel cell vehicle through an Internet network when a driver charges hydrogen in a hydrogen tank of his/her fuel cell vehicle at the specific hydrogen charging station, thereby allowing the fuel cell vehicles to smoothly charge hydrogen.

To achieve the object, an exemplary embodiment of the present disclosure provides a system for guiding hydrogen charging configured to include a first controller configured to transmit information for hydrogen charging of a fuel cell vehicle to a hydrogen charger, and to transmit to a sever hydrogen charging information when a hydrogen tank is charged with hydrogen by the hydrogen charger; a hydrogen charger configured to determine whether hydrogen charging for the fuel cell vehicle is available, based on the information for the hydrogen charging transmitted by the first controller; the server configured to index and record the hydrogen charging information transmitted by the first controller for each hydrogen charging station and each charging provision pressure, and then to transmit indexed charging availability information to a second controller of another vehicle to be charged; and the second controller configured to calculate a maximum chargeable amount and a required charging time for each hydrogen charging station for the hydrogen tank of the vehicle to be charged based on the indexed charging availability information transmitted by the server.

The first controller transmits to the hydrogen charger of the hydrogen charging station the information for the hydrogen charging, which includes a temperature of the hydrogen tank, a pressure of the hydrogen tank, a charging pressure, a size of the hydrogen tank, and a charging command of the fuel cell vehicle, when the fuel cell vehicle is connected to the hydrogen charger of the hydrogen charging station so as to be hydrogen-chargeable and communicable.

To transmit the information for the hydrogen charging, an infrared emitter is mounted on a hydrogen charging receptacle of the fuel cell vehicle, and an infrared receiver is mounted on a charging gun of the hydrogen charger.

The first controller is configured to transmit to the server the hydrogen charging information, which includes a charging time, a hydrogen charging pressure, a pressure upon initial charging of the hydrogen tank and a pressure upon charging termination thereof, a size of the hydrogen tank, and a position of the charging station, when the hydrogen tank is charge with hydrogen by the hydrogen charger.

The second controller is further configured to perform a control of displaying on a display in the vehicle the maximum chargeable amount and the required charging time for each hydrogen charging station for the hydrogen tank of the vehicle to be charged.

To achieve the object, another exemplary embodiment of the present disclosure provides a method for guiding hydrogen charging including transmitting, by a first controller of a fuel cell vehicle, information for hydrogen charging to a hydrogen charger of a hydrogen charging station when the fuel cell vehicle is connected to the hydrogen charger so as to be hydrogen-chargeable and communicable; determining, by the hydrogen charger, whether hydrogen charging for the fuel cell vehicle is available, based on the information for the hydrogen charging transmitted by the first controller; recording and transmitting to a server, by the first controller, hydrogen charging information when a hydrogen tank is charged with hydrogen by the hydrogen charger; indexing and recording, by the server, the hydrogen charging information transmitted by the first controller for each hydrogen charging station and each charging provision pressure, and then transmitting indexed charging availability information to a second controller of another vehicle to be charged; and calculating and displaying on a display, by the second controller, a maximum chargeable amount and a required charging time for each hydrogen charging station for the hydrogen tank of the vehicle to be charged based on the indexed charging availability information transmitted by the server.

When the transmitting information for hydrogen charging to a hydrogen charger includes transmitting charging request information including a temperature of the hydrogen tank, a pressure of the hydrogen tank, a charging pressure, a size of the hydrogen tank, and a charging command of the fuel cell vehicle.

When the hydrogen charger determines whether the hydrogen charging for the fuel cell vehicle is available, the hydrogen charger determines that the hydrogen charging is available when a hydrogen charging pressure provided by the hydrogen charging station is smaller than or equal to a rated charging pressure for the hydrogen tank of the fuel cell vehicle, and determines that the hydrogen charging is not available when the hydrogen charging pressure provided by the hydrogen charging station is larger than the rated charging pressure for the hydrogen tank of the fuel cell vehicle.

Preferably, when the hydrogen charger determines whether the hydrogen charging for the fuel cell vehicle is available, the hydrogen charger determines that the hydrogen charging is available when the hydrogen charging pressure provided by the hydrogen charging station is 350 bar and the rated charging pressure for the hydrogen tank of the fuel cell vehicle is 350 bar or 700 bar, and determines that the hydrogen charging is not available when the hydrogen charging pressure provided by the hydrogen charging station is 700 bar and the rated charging pressure for the hydrogen tank of the fuel cell vehicle is 350 bar.

When the hydrogen tank is charged with hydrogen, the first controller records a charging start time ($t_{start}$) of the hydrogen charger and an initial pressure ($P_{start}$) of the hydrogen tank, and determines whether the hydrogen tank is charged with a preset amount of hydrogen and whether the hydrogen charging for the hydrogen tank is stopped.

When is the first controller determines that the hydrogen tank is charged with the preset amount of hydrogen, the first controller records a full charging flag, and transmits to the server hydrogen charging information including a charging provision pressure ($P_{charge}$) of the hydrogen charger, a size of the charged hydrogen tank with the preset amount of hydrogen, and a position of the hydrogen charging station in addition to full charging availability notification information according to the full charging flag.

When the first controller determines that the hydrogen charging for the hydrogen tank is stopped, the first controller records a stop flag, and transmits to the server hydrogen charging information including the charging start time ($t_{start}$) and a stop time point ($t_{stop}$) of the hydrogen charging, a charging termination time, the initial pressure ($P_{start}$) of the hydrogen tank and a pressure ($P_{stop}$) of the hydrogen tank at the hydrogen charging stop time point, an outside air temperature upon charging, a charging provision pressure ($P_{charge}$), a position of the hydrogen charging station, and a size of the hydrogen tank in which the charging is stopped.

When transmitting the indexed charging availability information to the second controller of the vehicle to be charged, the server transmits charging availability information for each hydrogen charging station based on 350 bar to a vehicle mounted with a hydrogen tank of 350 bar type, and the server transmits charging availability information obtained by converting 350 bar into 700 bar in addition to the charging availability information for each hydrogen charging station based on 700 bar to a vehicle mounted with a hydrogen tank of 700 bar type.

When calculating the maximum chargeable amount for each hydrogen charging station for the hydrogen tank of the vehicle to be charged, the second controller estimates the maximum chargeable amount of the vehicle to be charged with reference to a preset hydrogen tank temperature map.

Through the above configuration, the present disclosure provides the following effects.

By estimating the maximum hydrogen chargeable amount and the required charging time for the hydrogen tank of the vehicle to be charged for each hydrogen charging station to perform the control of displaying them on the display in the vehicle, the driver may easily recognize the hydrogen charging station at which the charging may be immediately performed, thereby allowing the fuel cell vehicles to smoothly charge the hydrogen.

It is understood that the term "automotive" or "vehicular" or other similar term as used herein is inclusive of motor automotives in general such as passenger automobiles including sports utility automotives (operation SUV), buses, trucks, various commercial automotives, watercraft including a variety of boats and ships, aircraft, and the like, and includes hybrid automotives, electric automotives, plug-in hybrid electric automotives, hydrogen-powered automotives and other alternative fuel automotives (e.g., fuels derived from resources other than petroleum). As referred to herein, a hybrid automotive is an automotive that has two or more sources of power, for example both gasoline-powered and electric-powered automotives.

The above and other features of the disclosure are discussed infra.

BRIEF DESCRIPTION OF THE DRAWINGS

The above and other features of the present disclosure will now be described in detail with reference to certain exemplary examples thereof illustrated in the accompanying drawings which are given herein below by way of illustration only, and thus are not limitative of the present disclosure, and wherein.

Figure 1:
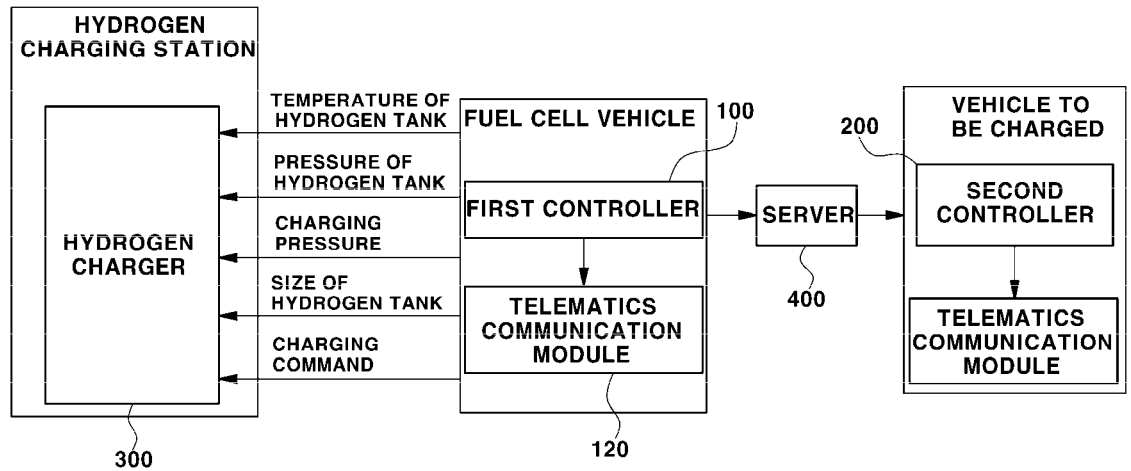
FIG. 1 is a diagram illustrating a configuration of a system for guiding hydrogen charging for a fuel cell vehicle according to the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in section by the particular intended application and use environment.

In the figures, reference numbers refer to the same or equivalent sections of the present disclosure throughout the several figures of the drawing.

DETAILED DESCRIPTION

Hereinafter, a preferred exemplary embodiment of the present disclosure will be described in detail with reference to the accompanying drawings.

Figure 2:
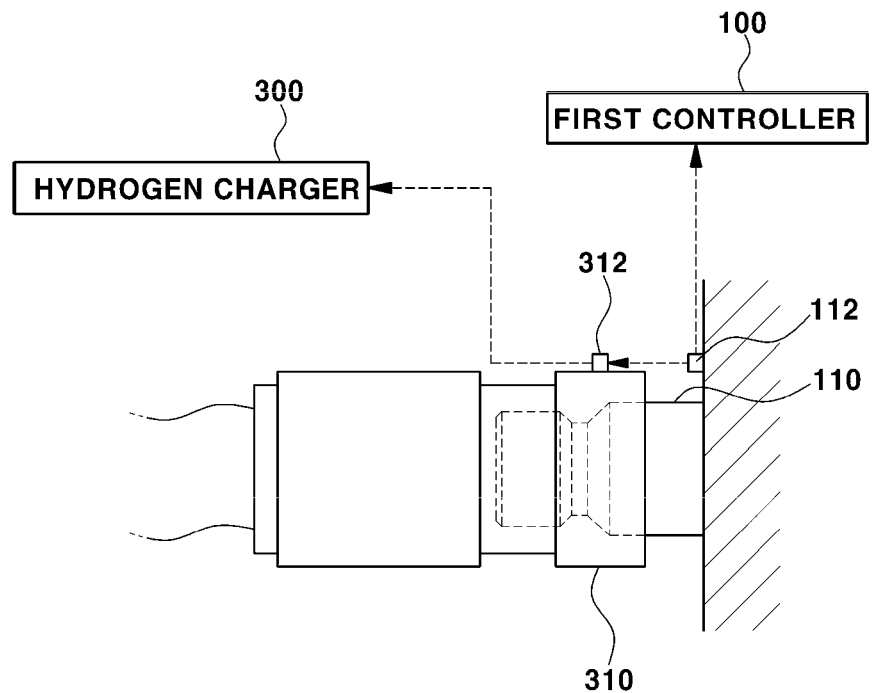
FIG. 2 is a schematic diagram illustrating a configuration for transmitting data between the fuel cell vehicle and a hydrogen charger of a hydrogen charging station.

FIG. 1 is a diagram illustrating a configuration of a system for guiding hydrogen charging for a fuel cell vehicle, and FIG. 2 illustrates a configuration for transmitting data between the fuel cell vehicle and a hydrogen charger of a hydrogen charging station.

As illustrated in FIG. 1, a system for guiding hydrogen charging according to the present disclosure is configured to include a first controller 100 and a telematics communication module 120 included in a fuel cell vehicle, a hydrogen charger 300 in charge of hydrogen charging of a hydrogen charging station and a control thereof, and a server 400 configured to receive and record various charging information and the like of the hydrogen charging station estimated by the first controller 100 and then to transmit them to a second controller 200 of a vehicle to be charged, which is another fuel cell vehicle.

When the fuel cell vehicle is connected to the hydrogen charger 300 of the hydrogen charging station to be hydrogen chargeable and communicable, the first controller 100 transmits information for hydrogen charging of the fuel cell vehicle to a control part of the hydrogen charger 300 of the hydrogen charging station.

In other words, when the fuel cell vehicle is connected to the hydrogen charger 300 of the hydrogen charging station to be hydrogen chargeable and communicable, the first controller 100 transmits an information signal, such as a temperature of the hydrogen tank, a pressure of the hydrogen tank, a charging pressure, a size of the hydrogen tank, and a charging command of the fuel cell vehicle to the control part of the hydrogen charger 300 of the hydrogen charging station.

To this end, to transmit the information for the hydrogen charging, an infrared emitter 112 is mounted on a hydrogen charging receptacle 110 of the fuel cell vehicle, and an infrared receiver 312 is mounted on a charging gun 310 of the hydrogen charger 300.

For example, as illustrated in FIG. 2, when the charging gun 310 of the hydrogen charger 300 of the hydrogen charging station is connected to the hydrogen charging receptacle 110 of the fuel cell vehicle to be chargeable, the infrared emitter 112 mounted on the receptacle 110 and the infrared receiver 312 mounted on the charging gun 310 become a data transmittable state, such that data signals such as the temperature of the hydrogen tank, the pressure of the hydrogen tank, the charging pressure, the size of the hydrogen tank, the charging command, and the like may be easily transmitted from the first controller 100 of the fuel cell vehicle to the hydrogen charger 300 of the hydrogen charging station through the infrared emitter 112 and the infrared receiver 312.

The hydrogen charger 300 determines whether hydrogen charging for the corresponding fuel cell vehicle is available, based on the information transmitted by the first controller 100.

In other words, when the hydrogen charger determines whether the hydrogen charging for the fuel cell vehicle is available, the hydrogen charger determines that the hydrogen charging is available when a hydrogen charging pressure provided by the hydrogen charging station is the same as or smaller than a rated charging pressure for the hydrogen tank of the fuel cell vehicle, and determines that the hydrogen charging is not available when the hydrogen charging pressure provided by the hydrogen charging station is larger than the rated charging pressure for the hydrogen tank of the fuel cell vehicle.

For example, when a substantial hydrogen charging pressure provided by the hydrogen charging station is 350 bar and the rated charging pressure for the hydrogen tank of the fuel cell vehicle is 350 bar or 700 bar, it is determined that the hydrogen charging is available, whereas when the substantial hydrogen charging pressure provided by the hydrogen charging station is 700 bar and the rated charging pressure for the hydrogen tank of the fuel cell vehicle is 350 bar, it is determined that the hydrogen charging is not available.

As the hydrogen charger 300 determines that the hydrogen charging is available, when the hydrogen charging for the hydrogen tank of the fuel cell vehicle is performed by the hydrogen charger 300, the first controller 100 records and transmits various hydrogen charging information (such as a charging time, a hydrogen charging pressure, a pressure upon initial charging of the hydrogen tank and a pressure upon charging termination thereof, a size of the hydrogen tank, and a position of the charging station) to the server 400.

Subsequently, the server 400 indexes and records various hydrogen charging information transmitted by the first controller 100 for each charging provision pressure and each hydrogen charging station of the hydrogen charger, and then transmits the indexed charging availability information and the like to the second controller 200 of the vehicle to be charged, which is another fuel cell vehicle. Hereinafter, the "charging availability information" may refer to whether or not hydrogen charging for the fuel cell vehicle is available.

The second controller 200 calculates a maximum chargeable amount and a required charging time for each hydrogen charging station for the hydrogen tank of the vehicle to be charged based on the indexed charging availability information and the like, and performs a control of displaying the calculated information on a display in the vehicle such that a driver may see the calculated information.

For example, the second controller 200 calculates the maximum chargeable amount of the vehicle to be charged based on a preset hydrogen tank temperature map, and calculates the required charging time based on the calculated maximum chargeable amount and a past charging history value.

Here, a method for guiding the hydrogen charging according to the present disclosure performed based on the above configuration will be described as follows.

Figure 3:
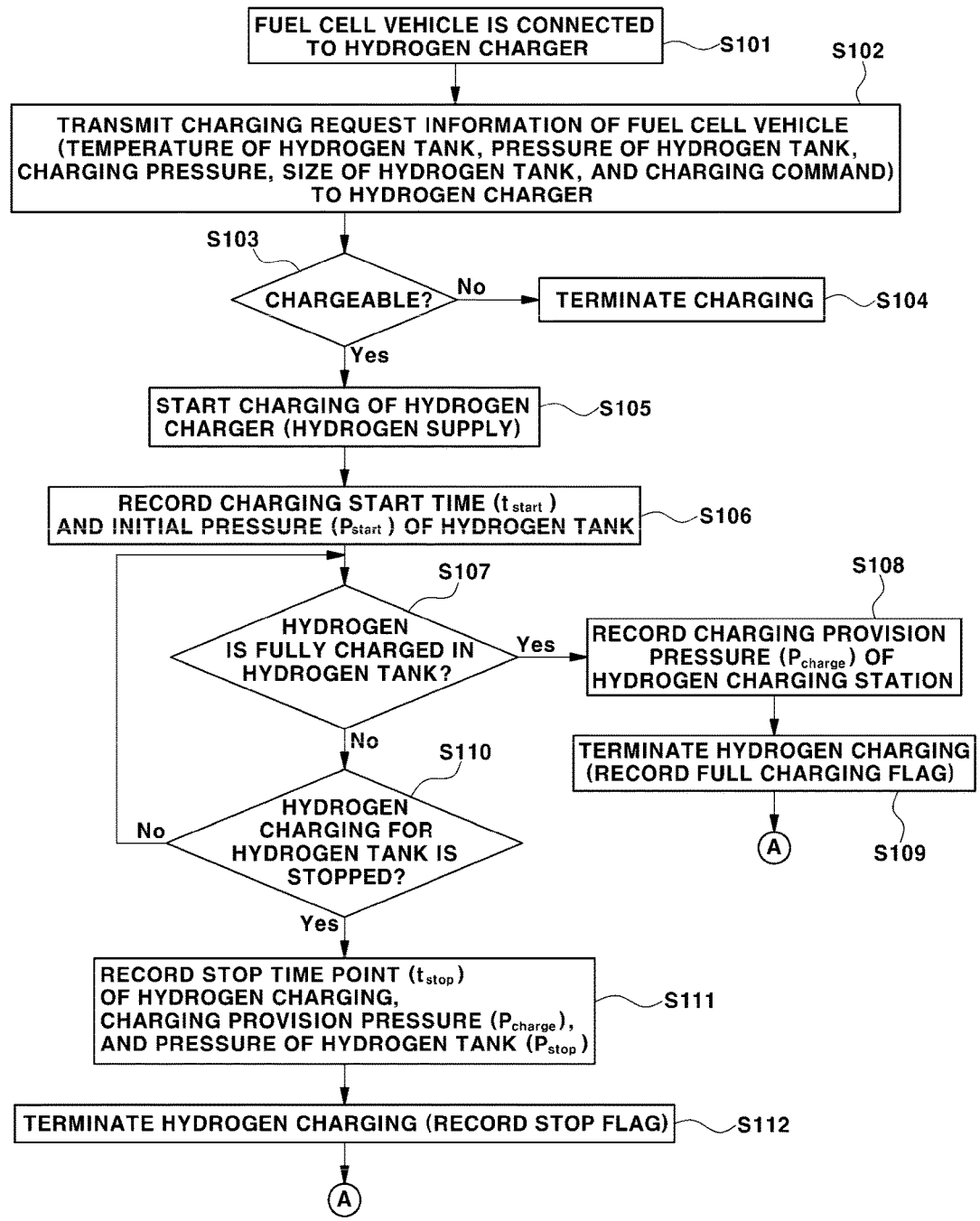
FIGS. 3 to 5 are flowcharts illustrating a method for guiding hydrogen charging for the fuel cell vehicle according to the present disclosure.
Figure 4:
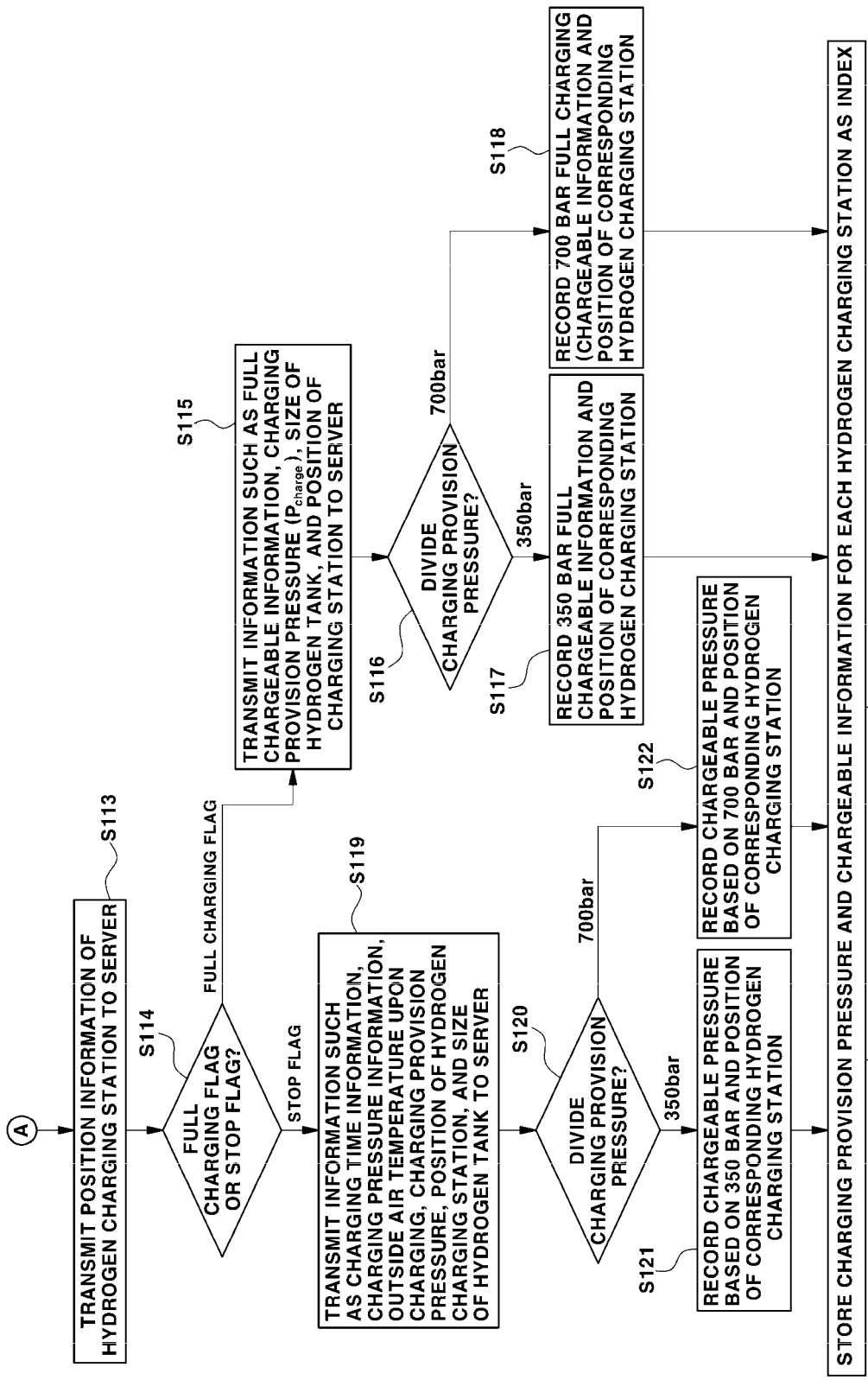
Figure 5:
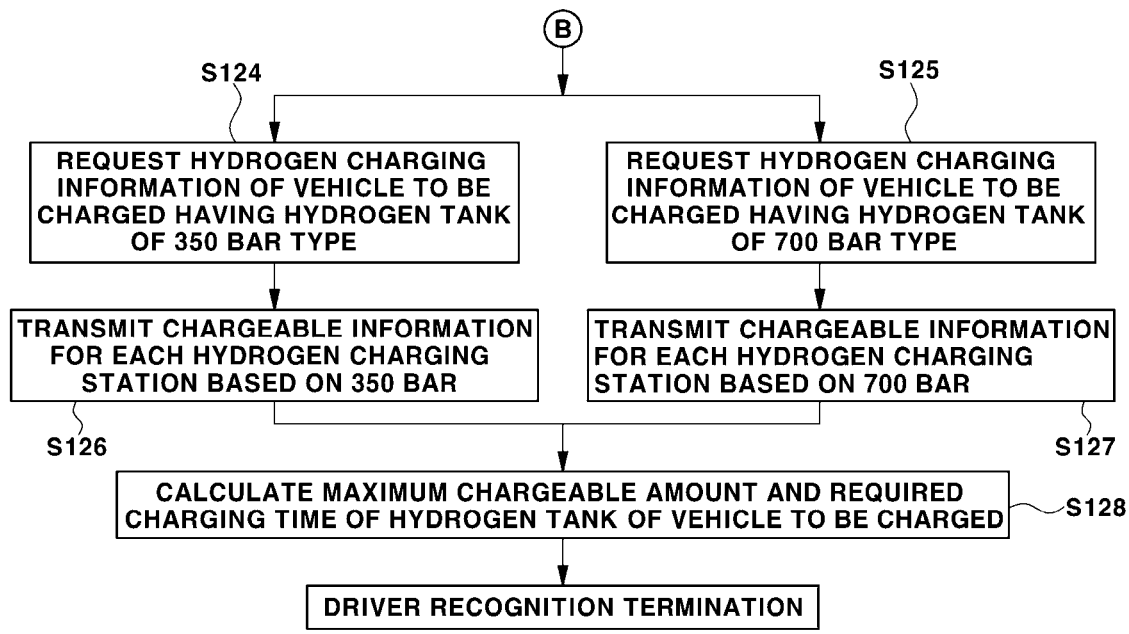

FIGS. 3 to 5 are flowcharts illustrating a method for guiding the hydrogen charging for the fuel cell vehicle according to the present disclosure.

First, the fuel cell vehicle is connected to the hydrogen charger of the hydrogen charging station to be hydrogen chargeable and communicable (S101).

For example, as illustrated in FIG. 2, the infrared emitter 112 mounted on the receptacle 110 and the infrared receiver 312 mounted on the charging gun 310 face to be data transmittable therebetween while the charging gun 310 of the hydrogen charger 300 of the hydrogen charging station is connected to the hydrogen charging receptacle 110 of the fuel cell vehicle to be chargeable.

Subsequently, the first controller 100 transmits charging request information including the temperature of the hydrogen tank, the pressure of the hydrogen tank, the charging pressure, the size of the hydrogen tank, the charging command, and the like of the fuel cell vehicle to the control part of the hydrogen charger 300 of the hydrogen charging station (S102).

For example, the infrared emitter 112 mounted on the receptacle 110 and the infrared receiver 312 mounted on the charging gun 310 are arranged to be data transmittable, such that the data signals representing the charging request information, such as the temperature of the hydrogen tank, the pressure of the hydrogen tank, the charging pressure, the size of the hydrogen tank, and the charging command, are transmitted from the first controller 100 of the fuel cell vehicle to the hydrogen charger 300 of the hydrogen charging station through the infrared emitter 112 and the infrared receiver 312.

Next, the hydrogen charger 300 determines whether the hydrogen charging for the corresponding fuel cell vehicle is available based on the information transmitted by the first controller 100 (S103).

For example, when the substantial hydrogen charging pressure provided by the hydrogen charging station is 350 bar and the rated charging pressure for the hydrogen tank of the fuel cell vehicle is 350 bar, it is determined that the hydrogen charging is available, whereas when the substantial hydrogen charging pressure provided by the hydrogen charging station is 700 bar and the rated charging pressure for the hydrogen tank of the fuel cell vehicle is 350 bar, it is determined that the hydrogen charging is not available.

As the determination result in S103, when it is determined that the hydrogen charging is not available, the charging is terminated (S104), and when it is determined that the hydrogen charging is available, the hydrogen charger 300 starts the charging supplying hydrogen to the hydrogen tank of the fuel cell vehicle (S105).

At this time, a charting start time ($t_{start}$) of the hydrogen charger 300, an initial pressure ($P_{start}$) of the hydrogen tank, and the like are recorded in the first controller 100 (S106).

Subsequently, whether the hydrogen charging for the hydrogen tank is fully charged is determined (S107).

For example, the first controller 100 may determine whether the hydrogen tank is fully charged by a signal of a sensor configured to detect the full charging of hydrogen for the hydrogen tank. According to one embodiment, the first controller 100 may determine that the hydrogen tank is fully charged when the hydrogen tank is charged with a preset amount of hydrogen.

As the determination result in S107, when it is determined that the hydrogen tank is fully charged with hydrogen, a charging provision pressure ($P_{charge}$) of the hydrogen charger 300, that is, the substantial hydrogen charging pressure provided by the hydrogen charging station is recorded in the first controller 100 (S107), and a full charging flag is recorded in the first controller 100 upon termination of the hydrogen charging (S108).

On the other hand, as the determination result in S107, when it is determined that the hydrogen tank is not to be fully charged with hydrogen, whether the hydrogen charging for the hydrogen tank is stopped is determined (S110).

For example, the first controller 100 may determine whether the hydrogen charging is stopped by a flow rate non-detection signal of a sensor configured to detect a hydrogen charging flow rate for the hydrogen tank.

As the determination result in S110, when it is determined that the hydrogen charging for the hydrogen tank is stopped, a stop time point ($t_{stop}$) of the hydrogen charging, a hydrogen tank pressure ($P_{stop}$) at the stop time point of the hydrogen charging, the charging provision pressure ($P_{charge}$) of the hydrogen charger, and the like are recorded in the first controller 100 (S111), and a stop flag is recorded in the first controller 100 upon termination of the hydrogen charging (S112).

At this time, the first controller 100 transmits position information of a current charging station to the server 400 through the telematics communication module 120 (S113).

Next, the first controller 100 determines whether the flag information is the full charging flag or the stop flag upon termination of the hydrogen charging (S114).

As the determination result in S114, when it is confirmed that the flag information is the full charging flag, the first controller 100 transmits fully chargeable notification information notifying that the hydrogen may be fully charged at the hydrogen charging station, and the hydrogen charging information including the charging provision pressure ($P_{charge}$) of the hydrogen charger upon full charging, the size of the fully charged hydrogen tank, the position of the hydrogen charging station, and the like to the server 400 through the telematics communication module 120 (S115).

Subsequently, the server 400 divides the charging provision pressure ($P_{charge}$) (S116).

For example, the server 400 divides whether the charging provision pressure ($P_{charge}$) is 350 bar or 700 bar according to the specification of the hydrogen tank.

Therefore, when it is confirmed that the charging provision pressure ($P_{charge}$) is 350 bar, the fully chargeable information notifying that the hydrogen may be fully charged at 350 bar and the hydrogen charging information including the position of the corresponding hydrogen charger are recorded (S117), whereas when it is confirmed that the charging provision pressure ($P_{charge}$) is 700 bar, the fully chargeable information notifying that the hydrogen may be fully charged at 700 bar and the hydrogen charging information including the position of the corresponding hydrogen charger and the like are recorded (S118).

On the other hand, as the determination result in S114, when it is confirmed that the flag information is the stop flag, the first controller 100 transmits hydrogen charging information including the charging time information (the charging start time ($t_{start}$), the stop time point ($t_{stop}$) of the hydrogen charging, and the charging termination time), the charging pressure information (the initial pressure ($P_{start}$) of the hydrogen tank and the hydrogen tank pressure ($P_{stop}$) at the stop time point of the hydrogen charging), an outside air temperature upon charging, the charging provision pressure ($P_{charge}$), the position of the hydrogen charging station, the size of the hydrogen tank in which the charging is stopped, and the like to the server 400 through the telematics communication module 120 (S119).

Subsequently, the server 400 divides the charging provision pressure ($P_{charge}$) (S120).

For example, the server 400 divides whether the charging provision pressure ($P_{charge}$) is 350 bar or 700 bar according to the specification of the hydrogen tank.

Therefore, when it is confirmed that the charging provision pressure ($P_{charge}$) is 350 bar, the hydrogen charging information including the maximum chargeable pressure (e.g., the hydrogen tank pressure ($P_{stop}$) at the stop time point of the hydrogen charging) based on 350 bar, the position of the corresponding charging station, and the like is recorded (S121), whereas when it is confirmed that the charging provision pressure ($P_{charge}$) is 700 bar, the hydrogen charging information including the maximum chargeable pressure (e.g., the hydrogen tank pressure ($P_{stop}$) at the stop time point of the hydrogen charging) based on 700 bar, the position of the corresponding hydrogen charging station, and the like is recorded (S122).

Subsequently, the server 400 indexes and stores the charging information recorded in S117 and S118, and the charging information recorded in S121 and S122 for each charging provision pressure and each hydrogen charging station (S123).

At this time, an example of the charging information indexed for each charging provision pressure and each hydrogen charging station is expressed in Table 1 below.

TABLE 1

| Charging station | 350 bar | 700 bar |
|---|---|---|
| A | Fully chargeable Time: ΔΔΔ Temperature: □□□ | Not supported |
| B | Not supported | Maximum chargeable pressure (Max $P_{B\text{-}stop}$) Time: ΔΔΔ Temperature: □□□ |
| ... | ... | ... |
| K | Fully chargeable Time: ΔΔΔ Temperature: □□□ | Maximum chargeable pressure (Max $P_{K\text{-}stop}$) Time: ΔΔΔ Temperature: □□□ |

Next, the vehicle to be charged having the hydrogen tank of a 350 bar type may request the charging information for the hydrogen charging for the server 400 (S124), or the vehicle to be charged having the hydrogen tank of a 700 bar type may request the charging information for the hydrogen charging for the server 400 (S125).

For example, the second controller 200 of the vehicle to be charged requiring the hydrogen charging may request the charging information for the hydrogen charging for the server 400 through the telematics communication module.

Therefore, the server 400 transmits the chargeable information for each hydrogen charging station based on the charging provision pressure of 350 bar to the second controller 200 of the vehicle to be charged having the hydrogen tank of the 350 bar type as expressed in Table 2 below (S126).

TABLE 2

| Charging station | 350 bar |
|---|---|
| A | Fully chargeable Time: ΔΔΔ Temperature: □□□ |
| B | Not supported |
| ... | ... |
| K | Fully chargeable Time: ΔΔΔ Temperature: □□□ |

At this time, since the hydrogen tank of the 350 bar type may not be charged by the charging provision pressure of 700 bar, only the chargeable information for each hydrogen charging station based on the charging provision pressure of 350 bar is transmitted to the second controller 200 of the vehicle to be charged as expressed in Table 2.

Alternatively, the server 400 transmits the chargeable information for each hydrogen charging station based on the charging provision pressure of 700 bar to the second controller 200 of the vehicle to be charged having the hydrogen tank of 700 bar type as expressed in Table 3 below (S127).

TABLE 3

| Charging station | 700 bar conversion | | Charging station | 350 bar | 700 bar |
|---|---|---|---|---|---|
| A | Minimum 350 bar chargeable Time: ΔΔΔ Temperature: □□□ | | A | Fully chargeable Time: ΔΔΔ Temperature: □□□ | Not supported |
| B | Not supported | conversion ← | B | Not supported | Maximum chargeable pressure (Max $P_{B\text{-}stop}$) Time: ΔΔΔ Temperature: □□□ |
| ... | ... | | ... | ... | ... |
| K | Minimum 350 bar chargeable Time: ΔΔΔ Temperature: □□□ | | K | Fully chargeable Time: ΔΔΔ Temperature: □□□ | Maximum chargeable pressure (Max $P_{K\text{-}stop}$) Time: ΔΔΔ Temperature: □□□ |

At this time, since the hydrogen tank of the 700 bar type may also be charged by the charging provision pressure of 350 bar, the chargeable information obtained by converting the charging provision pressure of 350 bar into the charging provision pressure of 700 bar in addition to the chargeable information for each hydrogen charging station based on the charging provision pressure of 700 bar may be transmitted as expressed in Table 3.

Next, the second controller 200 calculates the maximum chargeable amount and the required charging time for the hydrogen tank of the vehicle to be charged for each hydrogen charging station based on the indexed charging availability information and the like (S128).

Preferably, when calculating the maximum chargeable amount for the hydrogen tank of the vehicle to be charged for each hydrogen charging station based on the indexed charging availability information and the like, the second controller 200 estimates the maximum chargeable amount of the vehicle to be charged with reference to the preset hydrogen tank temperature map.

In other words, since temperature conditions between the hydrogen tanks of the past charging vehicle and the vehicle to be charged are different and thus the maximum chargeable amounts thereof may be different, the current maximum chargeable amount of the vehicle to be charged is estimated based on a maximum charging amount map according to the temperature of the hydrogen tank.

TABLE 4

|  | Tank temperature (° C.) | | |
|---|---|---|---|
| Based on 700 bar | 10 | 20 | ... |
| Maximum chargeable amount | AA BB | cc DD | ee FF |

For example, based on an error map representing the maximum chargeable amount according to the temperature of the hydrogen tank expressed in Table 4, when the current temperature of the hydrogen tank of the vehicle to be charged is 20° C., the maximum chargeable amount of the vehicle to be charged may be differently estimated compared to the maximum chargeable amount when the temperature of the hydrogen tank upon past charging is 10° C.

Further, the second controller 200 calculates the required charging time when the maximum chargeable amount is charged in the hydrogen tank of the vehicle to be charged for each hydrogen charging station based on the indexed charging availability information and the like, and as described above, calculates the required charging time of the maximum chargeable amount estimated by the error map representing the maximum chargeable amount according to the temperature of the hydrogen tank.

As described above, the second controller 200 estimates the maximum chargeable amount and the required charging time for the hydrogen tank of the vehicle to be charged for each hydrogen charging station to perform a control of displaying them on the display in the vehicle, such that the driver may easily recognize the hydrogen charging station at which the charging may be immediately performed, thereby allowing the fuel cell vehicles to smoothly charge hydrogen.

Each of the first and second controllers 100 and 200 according to an exemplary embodiment of the present disclosure may be a processor (e.g., computer, microprocessor, CPU, ASIC, circuitry, logic circuits, etc.). Each controller may be implemented by a non-transitory memory storing, e.g., a program(s), software instructions reproducing algorithms, etc., which, when executed, controls operations of various components of the vehicle, and a processor configured to execute the program(s), software instructions reproducing algorithms, etc. Herein, the memory and the processor may be implemented as separate semiconductor circuits. Alternatively, the memory and the processor may be implemented as a single integrated semiconductor circuit. The processor may embody one or more processor(s).

As described above, although the present disclosure has been described in detail with one exemplary embodiment, the scope of the present disclosure is not limited to the aforementioned one exemplary embodiment, and various modifications and improvements by those skilled in the art using the basic concept of the present disclosure defined by the appended claims are also included in the scope of the present disclosure.

What is claimed is:

1. A system for guiding hydrogen charging comprising:
    a first controller configured to transmit information for hydrogen charging of a fuel cell vehicle to a hydrogen charger of a hydrogen charging station, and to transmit to a sever hydrogen charging information, when a hydrogen tank is charged with hydrogen by the hydrogen charger;
    the hydrogen charger configured to determine whether hydrogen charging for the fuel cell vehicle is available, based on the information for the hydrogen charging transmitted by the first controller;
    the server configured to index and record the hydrogen charging information transmitted by the first controller for each hydrogen charging station and each charging pressure, and then to transmit indexed charging availability information to a second controller of another vehicle to be charged; and
    the second controller configured to calculate a maximum chargeable amount and a required charging time for each hydrogen charging station for the hydrogen tank of the another vehicle to be charged based on the indexed charging availability information transmitted by the server.

2. The system of claim 1,
    wherein the first controller transmits to the hydrogen charger of the hydrogen charging station the information for the hydrogen charging, which comprises a temperature of the hydrogen tank, and a charging command to the fuel cell vehicle, when the fuel cell vehicle is connected to the hydrogen charger of the hydrogen charging station so as to be hydrogen-chargeable and communicable.

3. The system of claim 2,
    wherein to transmit the information for the hydrogen charging, an infrared emitter is mounted on a hydrogen charging receptacle of the fuel cell vehicle, and an infrared receiver is mounted on a charging gun of the hydrogen charger.

4. The system of claim 1,
    wherein the first controller transmits to the server the hydrogen charging information, which comprises a charging time, a hydrogen charging pressure, an initial pressure and an ending pressure of the hydrogen tank during charging, a size of the hydrogen tank, and a position of the hydrogen charging station, when the hydrogen tank is charged with hydrogen by the hydrogen charger.

5. The system of claim 1,
    wherein the second controller is further configured to perform a control of displaying on a display in the another vehicle the maximum chargeable amount and the required charging time for each hydrogen charging station for the hydrogen tank of the another vehicle to be charged.

6. A method for guiding hydrogen charging, the method comprising:
    transmitting, by a first controller of a fuel cell vehicle, information for hydrogen charging to a hydrogen charger of a hydrogen charging station when the fuel cell vehicle is connected to the hydrogen charger so as to be hydrogen-chargeable and communicable;

determining, by the hydrogen charger, whether hydrogen charging for the fuel cell vehicle is available, based on the information for the hydrogen charging transmitted by the first controller;

recording and transmitting to a server, by the first controller, hydrogen charging information when a hydrogen tank is charged with hydrogen by the hydrogen charger;

indexing and recording, by the server, the hydrogen charging information transmitted by the first controller for each hydrogen charging station and each charging provision pressure, and then transmitting indexed charging availability information to a second controller of another vehicle to be charged; and calculating and displaying on a display, by the second controller, a maximum chargeable amount and a required charging time for each hydrogen charging station for the hydrogen tank of the another vehicle to be charged based on the indexed charging availability information transmitted by the server.

7. The method of claim 6,
wherein the transmitting information for hydrogen charging to the hydrogen charger includes transmitting charging request information comprising a temperature of the hydrogen tank, a pressure of the hydrogen tank, a charging pressure, a size of the hydrogen tank, and a charging command of the fuel cell vehicle.

8. The method of claim 6,
wherein when the hydrogen charger determines whether the hydrogen charging for the fuel cell vehicle is available, the hydrogen charger determines that the hydrogen charging is available when a hydrogen charging pressure provided by the hydrogen charging station is smaller than or equal to a rated charging pressure for the hydrogen tank of the fuel cell vehicle, and determines that the hydrogen charging is not available when the hydrogen charging pressure provided by the hydrogen charging station is larger that the rated charging pressure for the hydrogen tank of the fuel cell vehicle.

9. The method of claim 8,
wherein when the hydrogen charger determines whether the hydrogen charging for the fuel cell vehicle is available, the hydrogen charger determines that the hydrogen charging is available when the hydrogen charging pressure provided by the hydrogen charging station is 350 bar and the rated charging pressure for the hydrogen tank of the fuel cell vehicle is 350 bar or 700 bar, and determines that the hydrogen charging is not available when the hydrogen charging pressure provided by the hydrogen charging station is 700 bar and the rated charging pressure for the hydrogen tank of the fuel cell vehicle is 350 bar.

10. The method of claim 6,
wherein when the hydrogen tank is charged with hydrogen, the first controller records a charging start time ($t_{start}$) of the hydrogen charger and an initial pressure ($P_{start}$) of the hydrogen tank, and determines whether the hydrogen tank is charged with a preset amount of hydrogen and whether the hydrogen charging for the hydrogen tank is stopped.

11. The method of claim 10,
wherein when the first controller determines that the hydrogen tank is charged with the present amount of hydrogen, the first controller records a full charging flag, and transmits to the server hydrogen charging information comprising a charging pressure ($P_{charge}$) of the hydrogen charger a size of the charged hydrogen tank with the preset amount of hydrogen and a position of the hydrogen charging station in addition to full charging availability information according to the full charging flag.

12. The method of claim 10,
wherein when the first controller determines that the hydrogen charging for the hydrogen tank is stopped, the first controller records a stop flag, and transmits to the server hydrogen charging information comprising the charging start time ($t_{start}$) and a stop time ($t_{stop}$) of the hydrogen charging, a charging termination time, the initial pressure ($P_{start}$) of the hydrogen tank and a pressure ($P_{stop}$) of the hydrogen tank at the hydrogen charging stop time point, an outside air temperature upon charging, a charging provision pressure ($P_{charge}$), a position of the hydrogen charging station, and a size of the hydrogen tank in which the charging is stopped.

13. The method of claim 6,
wherein when transmitting the indexed charging availability information to the second controller of the another vehicle to be charged, the server transmits charging availability information for each hydrogen charging station based on 350 bar to a vehicle mounted with a hydrogen tank of 350 bar type.

14. The method of claim 6,
wherein when transmitting the indexed charging availability information to the second controller of the another vehicle to be charged, the server transmits charging availability information obtained by converting 350 bar into 700 bar in addition to the charging availability information for each hydrogen charging station based on 700 bar to a vehicle mounted with a hydrogen tank of 700 bar type.

15. The method of claim 6,
wherein when calculating the maximum chargeable amount for each hydrogen charging station for the hydrogen tank of the another vehicle to be charged, the second controller estimates the maximum chargeable amount of the another vehicle to be charged with reference to a preset hydrogen tank temperature map.

\* \* \* \* \*